United States Patent [19]
Grimm et al.

[11] Patent Number: 5,203,605
[45] Date of Patent: Apr. 20, 1993

[54] FOLDING ROOF FOR AN AUTOMOBILE

[75] Inventors: Rainer Grimm, Wetzlar; Horst Böhm, Frankfurt, both of Fed. Rep. of Germany

[73] Assignees: Rockwell Golde GmbH, Fed. Rep. of Germany; Rockwell Golde GmbH, Fed. Rep. of Germany

[21] Appl. No.: 808,505

[22] Filed: Dec. 17, 1991

[30] Foreign Application Priority Data

Dec. 28, 1990 [DE] Fed. Rep. of Germany ....... 4042020

[51] Int. Cl.$^5$ .............................................. B60J 7/06
[52] U.S. Cl. .................................. 296/219; 296/223; 296/224; 292/DIG. 5
[58] Field of Search ............... 296/121, 216, 219, 223, 296/224; 292/DIG. 5

[56] References Cited

U.S. PATENT DOCUMENTS 1,715,940 6/1929 Mobbs ..................... 292/DIG. 5 X
4,136,906 1/1979 Ireland et al. ............ 292/DIG. 5 X

FOREIGN PATENT DOCUMENTS 132091 2/1933 Austria .................................. 296/219
3722434 11/1992 Fed. Rep. of Germany .

*Primary Examiner*—Dennis H. Pedder

[57] ABSTRACT

In a folding roof for an automobile, a front hood bar is moved by entraining elements driven by cables, which entraining elements can travel in curved transitions of lateral guide rails and simultaneously in curved control slits of control plates, slidable transversely on the front hood bar. The control slits run partly ascending towards the closure position, in order to create a downward displacement of the front hood bar as the roof is closed and an upward displacement of the hood bar as the roof is opened. The closing of the roof takes place with a continually decreasing speed of movement and continually increasing closure force, without any noticeable feedback effect upon the actuating force to be applied.

4 Claims, 6 Drawing Sheets

FOLDING ROOF FOR AN AUTOMOBILE

BACKGROUND OF THE INVENTION

This invention relates to a folding roof for an automobile.

A known folding roof has a front hood bar, slidably guided at both sides of the roof opening on lateral guide rails and movable by a drive device, a fixed, rear hood bar and a foldable hood extending between the hood bars, which foldable hood is tightened by the front hood bar on closure, the front hood bar, when the roof is closed, being pressed with its front edge sealed onto the fixed automobile roof.

In folding roofs of this type, it is of great importance that the front hood bar, when the roof is closed, shall hold the hood tightened and, in the last phase of its movement, shall be pressed sealingly and firmly with its front edge onto the forward, fixed roof surface.

In a known folding roof of this type (DE 37 22 434 A1), on either side of the forward hood bar, opening/closing mechanisms are provided which, in conjunction with the drive device acting thereon, are intended to assure the tightening and pressing-on. For this purpose vertically disposed guide plates, displaceable on the lateral guide rails, are provided on the opening/closing mechanisms, in the straight, oblique guide slits of which guide plates guide pins engage, these pins being mounted on driven slide blocks, also displaceable on the lateral guide rails.

By the lateral arrangement of the opening/closing mechanisms, fairly remote from the front edge of the front hood bar, the front edge is not subjected to a pressure sufficient for all requirements, especially not in its central region. Since the inclined guide slits in the vertically disposed guide plates are only comparatively short, only a small guide slit travel distance is available for the tightening and closing of the known folding roof, so that considerable application of force is necessary in tightening and closing. Furthermore, the vertically mounted plates of the opening/closing mechanisms increase the overall height of the folding roof construction.

SUMMARY OF THE INVENTION

An object of the present invention is to provide a folding roof for automobiles which, with comparatively small application of force, shall facilitate a tensioning and closing movement of the front hood bar, but achieves a high application pressure of this front edge against the fixed roof surface and which is of low overall height.

According to the present invention, there is provided a folding roof for an automobile for the optional closure or partial exposure of a roof opening formed in a fixed vehicle roof, comprising a front hood bar, slidably guided at both sides of the roof opening on lateral guide rails and movable by a drive device, a fixed, rear hood bar and a foldable hood extending between the hood bars, which foldable hood is tightened by the front hood bar on closure, the front hood bar, when the roof is closed, being pressed with its front edge sealed onto the fixed automobile roof, wherein the lateral guide rails are adjoined at the front by curved transitions, which are continued parallel to the front edge of the roof opening and are provided with an upwardly open guide channel, continuous at least partly also along the lateral guide rails, in which guide channel, at each side, an upwardly projecting entraining element is slidably guided and the entraining elements are synchronously movable by drive cables, the entraining elements are each force-transmittingly connected with the front hood bar by a control plate guided slidably in the transverse direction on the front hood bar, the upper ends of the entraining elements each engaging longitudinally slidably but axially immovably into a control slit formed in each control plate, which slit, starting from a section, parallel to the front edge of the roof opening, continues into a rearwardly curved section, of which the radius of curvature is larger than that of the guide channel in the curved transitions, the control slits are arranged upwardly ascending in their sections, parallel to the front edge of the roof opening, starting from the curved sections, and the control plates bear slidably with their outer ends against wall surfaces of the guide rails corresponding to the curved transitions.

By the curved form of the guide channels, continuing to the forward edge of the roof opening and parallel to it there, in conjunction with the curved control slits in the substantially horizontally orientated control plates, large tightening and closure forces, increasing still further as the movement proceeds, can be achieved in the tightening and closing movement with a relatively low drive force, and with a correspondingly slowing-down movement control of the front hood bar. The application of the force acts increasingly towards the central region of the front edge of the front hood bar, and in the vicinity of this front edge, so that a reliable seal of the front edge is achieved. The application pressure is created by the ascending portions of the control slits provided in the control plates. By the substantially horizontally guided control plates, a favourably low overall height of the folding roof construction is maintained.

The use lateral guide rails having forward, curved transitions facilitates the construction of a single-piece guide frame, which in its forward region, parallel to the front edge of the roof opening, permits the fitting of a drive device engaging with the drive cables.

If the guide frame is a rigid frame, closed on all sides, then the folding roof can be constructed as a fully preassembled unit. This is particularly advantageous because folding roofs of this type are usually manufactured outside the automobile factory and this construction makes possible complete functional testing of the folding roof construction before it is installed into an automobile roof.

BRIEF DESCRIPTION OF THE DRAWINGS

For a better understanding of the invention and to show how the same may be carried into effect, reference will now be made, by way of example, to the accompanying drawings, in which.

DESCRIPTION OF THE PREFERRED EMBODIMENTS

Figure 1:
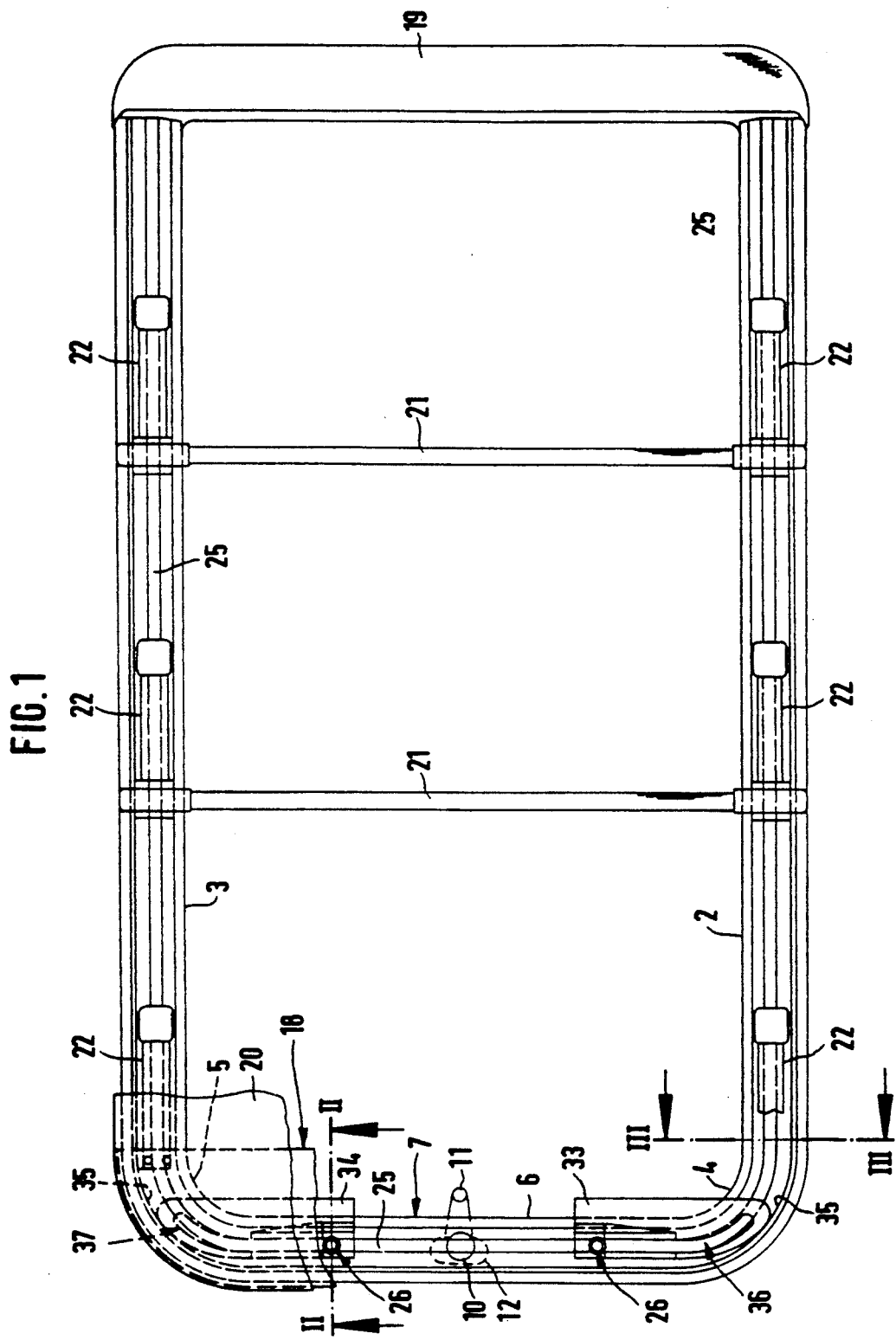
FIG. 1 is a plan view of a folding roof, constructed as a single installation unit, in a closed position of its functional parts and with a hood itself largely cut away.
Figure 2:
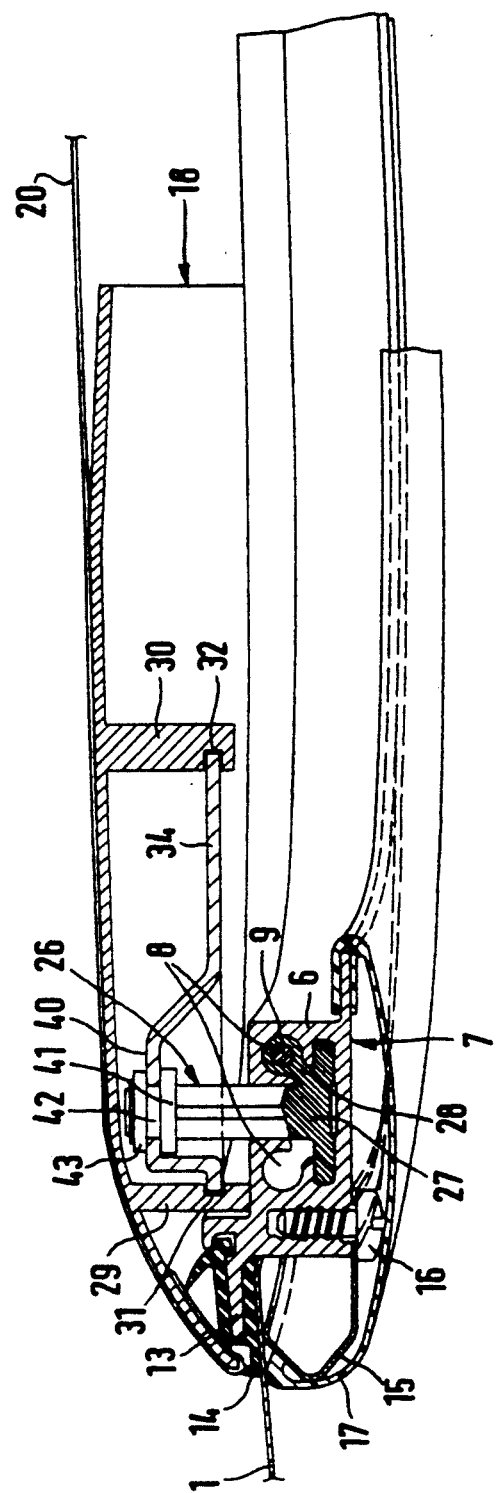
FIG. 2 is a partial, sectional view taken along the line II—II in FIG. 1.
Figure 3:
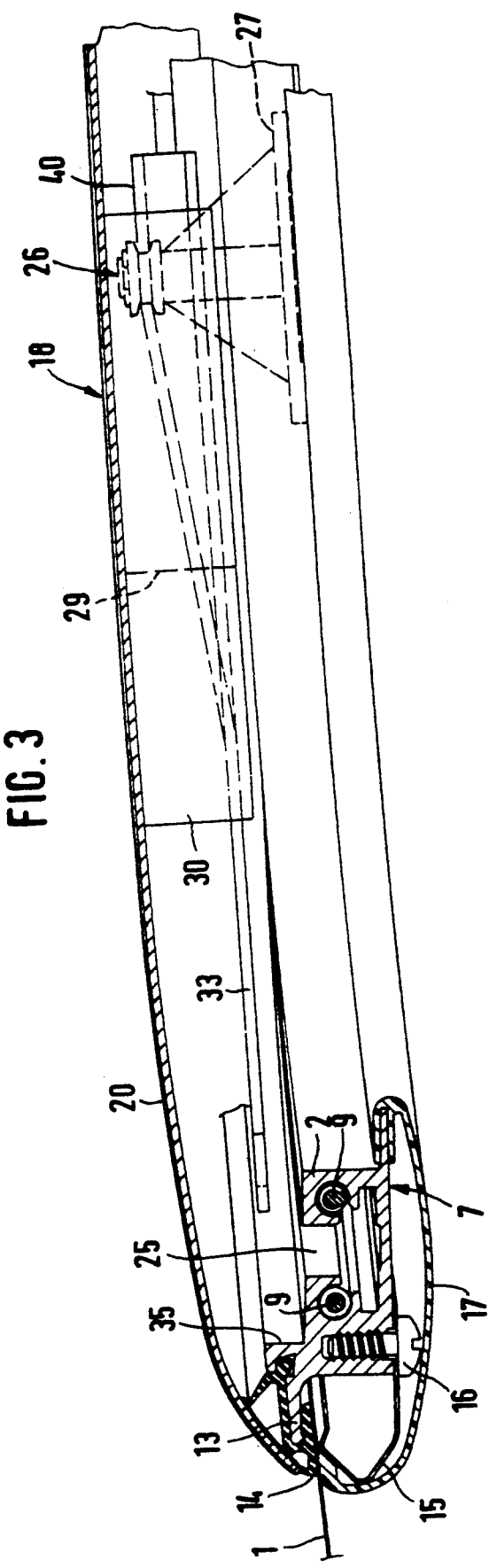
FIG. 3 is a partial, sectional view taken along the line III—III in FIG. 1.

Reference is first made to FIGS. 1 to 3, of which FIG. 2 shows a cross-section through the arrangement of the front hood bar and the front edge of the roof opening, while FIG. 3 shows a cross-section through a lateral guide rail. In FIG. 3 and also in FIGS. 4 to 6, only the left side of the roof construction is shown in each. The right side is the same but to opposite hand.

The fixed automobile roof 1 is shown in FIGS. 2 and 3 only as a cut-away and sectioned, curved metal plate, in which is disposed the roof opening into which the folding roof is installed. On either side of the roof opening there are lateral guide rails 2, 3 respectively, which are combined together by curved transitions 4, 5 respectively and a front portion 6, connecting the curved transitions 4, 5 together, into a single-piece guide frame 7, having a uniform cross-section throughout. The guide frame 7 is provided with two mutually facing, continuous guide channels 8 for drive cables 9. The drive cables 9 are guided in the guide channels 8 in tension-stiff and compression-stiff manner and engage, in the example shown, in a pinion 10 shown in FIG. 1, which can be rotated by means of a hand crank 11 of a drive device 12, mounted on the front section 6. Rotation of the hand crank 11 and thus of the pinion 10 produce displacements in opposite directions of the flexible drive cables 9, constructed like toothed racks, which in turn cause movements of the folding roof in a manner to be described. An electric motor could, of course, be provided for the crank drive.

The guide frame 7, with its outwardly directed flange 13, fits over the fixed automobile roof 1 and bears against it through an elastic sealing profile 14 placed between. The fixing of the guide frame 7 to the automobile roof 1 is provided by a fixing frame 15, which bears on the one hand against the lower face of the automobile roof 1 and on the other hand against the lower face of the guide frame 7, with which it is connected by screws 16. The guide frame 7, fixing frame 15 and screws 16 are covered off from the interior of the vehicle by a cladding profile 17.

The folding roof possesses, furthermore, a movable front hood bar 18, a fixed rear hood bar 19, which connects the free ends of the lateral guide rails 2, 3 of the guide frame 7 rigidly together to a stiff frame, closed on all sides, and a foldable hood 20, extending between the hood bars 18, 19. In FIG. 1, the forward hood bar 18 is partly cut away, to illustrate the functional parts situated beneath. In addition, two transverse bars 21, supporting the hood 20, are shown in this example distributed over the length of the folding roof, the ends of these bars being displaceably guided in the lateral guide rails 2 and 3. On the front hood bar 18 and on the two transverse bars 21, elastic folding supports 22 are fitted, which during the opening displacement of the hood 20 cause the forming of upwardly directed folds of the hood.

The lateral guide rails 2, 3, the curved transitions 4, 5 and the front portion 6 of the guide frame 7 have a continuous, upwardly open guide channel 25, in which on each side a vertically, upwardly projecting entraining element 26 is slidably guided. The entraining elements 26 each have a sliding foot 27, which is slidably guided by lateral projections in undercut, lateral grooves of the guide channel 25, as FIG. 2 illustrates. The entraining elements 26, therefore, cannot be pulled out upwards from the guide channel 25. Moreover, the entraining elements 26 are each force-transmittingly connected by a web 28 to one of the drive cables 9. When the drive device 12 is actuated, the entraining elements 26 are displaced synchronously and in opposite directions in the guide channel.

On the front hood bar 18, in the region of each front roof corner, there are two mutually facing, downwardly orientated ribs 29 and 30, extending parallel to the front portion 6 of the guide frame 7. In these ribs 29 and 30 there are mutually facing grooves 31, 32 respectively, in which a control plate 33, 34 respectively is displaceably guided in the transverse direction on each side of the roof. With their outer ends, these control plates 33 and 34 are slidingly supported against the wall faces 35 of the guide frame 7, of which the curvature is adapted to the curved transitions 4, 5 respectively and the curvatures of the portions of the guide channel 25 situated therein.

Figure 4:
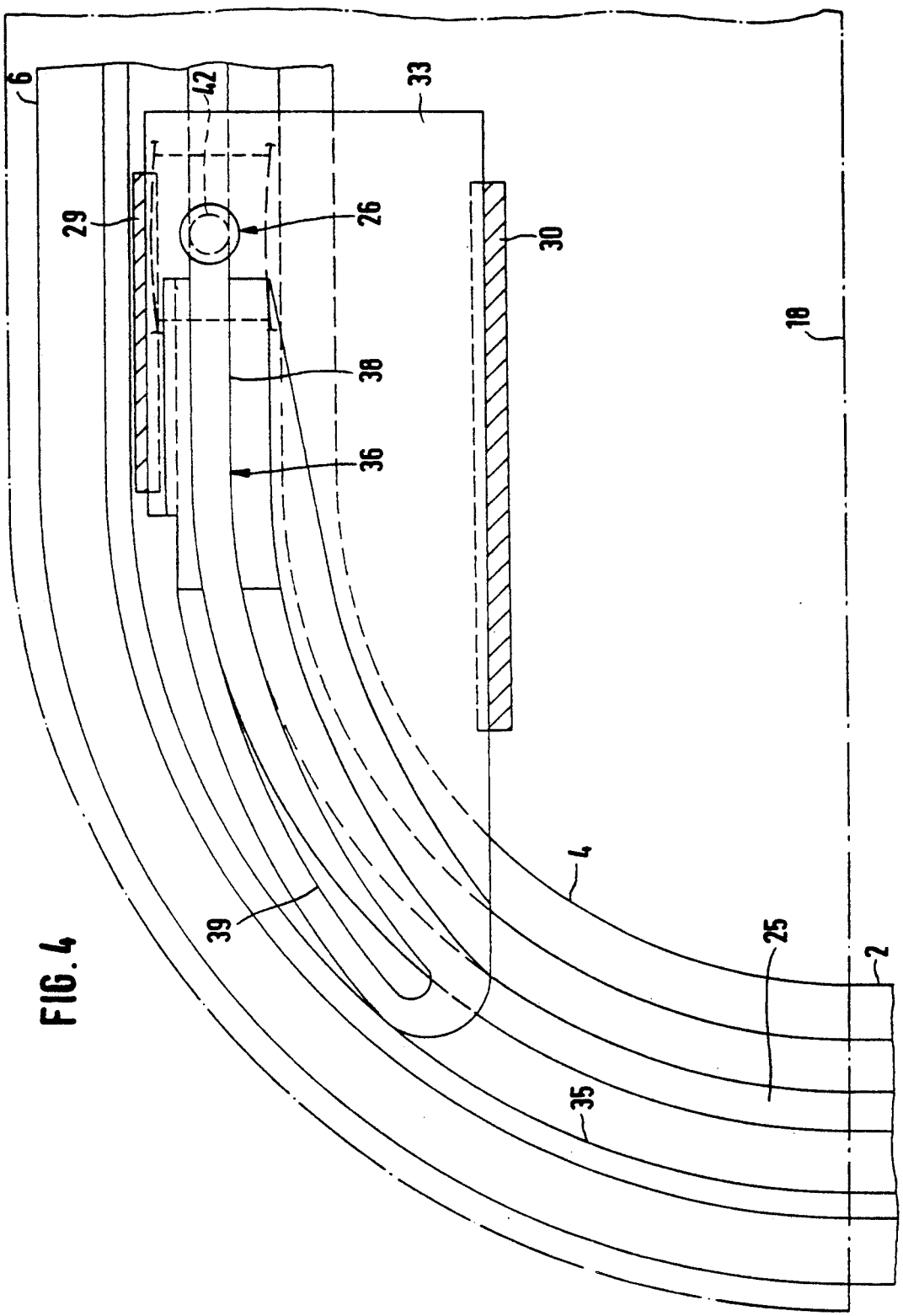
FIG. 4 is a partial plan on the left, front corner of the folding roof construction, with most of a front hood bar not shown due to the horizontal orientation of the section, the components being in the closed position.

In the control plates 33 and 34 there are control slits 36, 37 respectively, which each continue, starting from a section 38 parallel to the front portion 6 of the guide frame 7 and to the front edge of the roof opening, into a backwardly curved section 39. The radii of curvature of the curved sections 39 are larger than those of the guide channel 25 in the curved transitions 4 and 5 of the guide frame 7. The control slits 36, 37, approximately in their sections 38 parallel to the front portion 6 of the guide frame 7 or front edge of the roof opening, are disposed upwardly ascending starting from the curved sections 39, as can be seen from FIGS. 2 and 3. For this purpose, the control plates 33 and 34 are provided with upwardly orientated, ramp-like indentations 40, in which the sections 38 of the control slits 36, 37 run. The arrangement is such that the sections 38 of the control slits 36, 37 are in alignment with the portion of the guide channel 25 situated beneath them when the roof is closed, as FIG. 4 shows. The curved sections 39, in contrast, because of the described differences in radii of curvature, do not register with the portions of the guide channel 25 in the curved transitions 4, 5 of the guide frame 7.

At the free end of each of the entraining elements 26 there is a guide flange 41, from which there projects upwards a guide pin 42, which passes through the control slit 36, 37 respectively and on which a washer 43 is fitted on with sufficient axial clearance, being secured by a snap ring or the like. The front hood bar 18 can therefore not be lifted upwards off the entraining elements 26.

Figure 6:
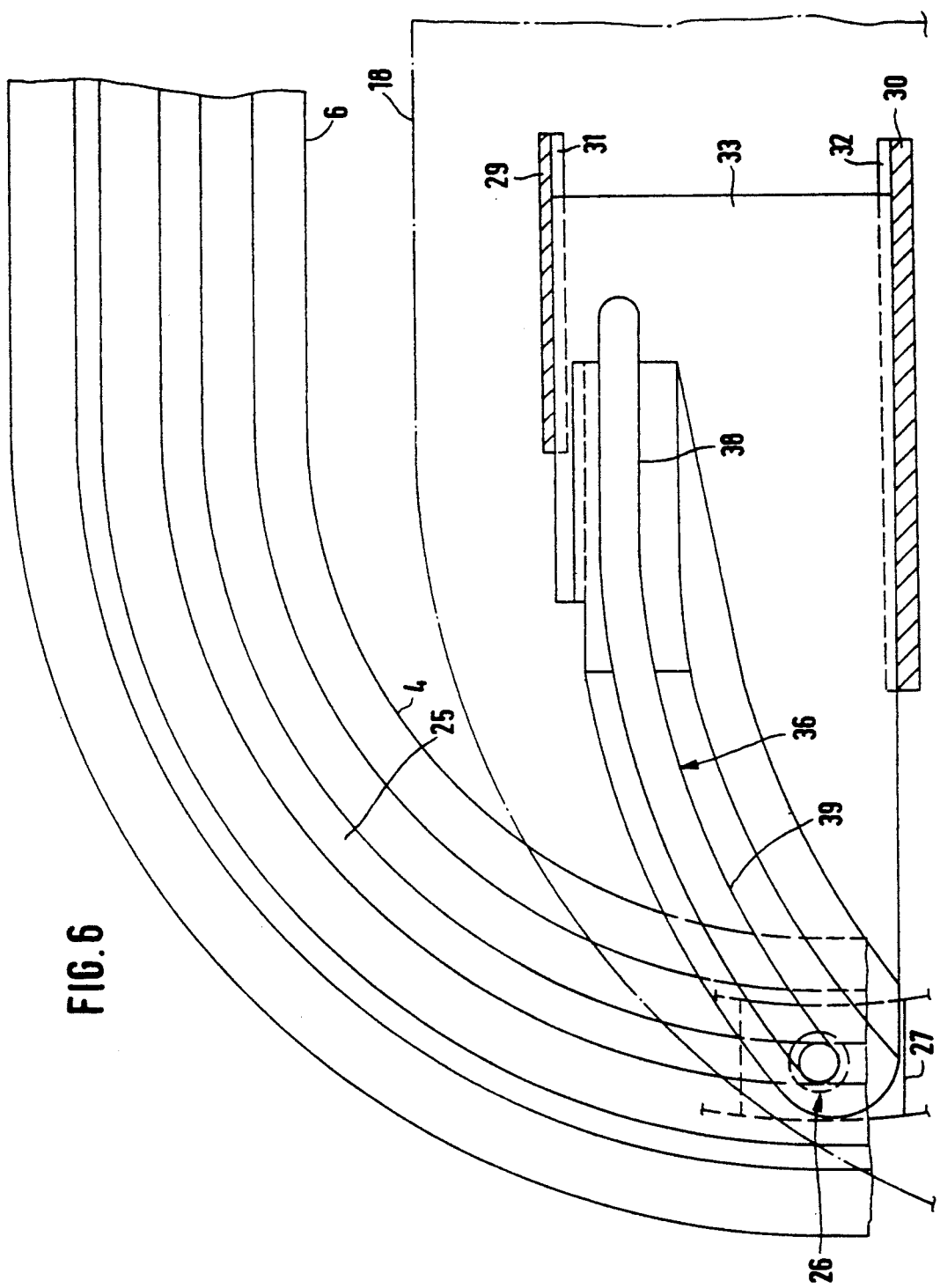
FIG. 6 is a plan view corresponding to FIGS. 4 and 5, but in the position of the functional parts when the front hood bar is completely lifted off and ready for sliding.

When the folding roof is wholly or partly opened, the entraining elements 26 are situated within the lateral guide rails 2, 3, the control plates 33, 34 on the front hood bar 18 being displaced as far as possible outwards, as shown in FIG. 6 at the example of the left control plate 33. The guide pin 42 of entraining element 26 is here in the abutment position against the outer end of the control slit 36. It will be seen that, on account of this abutment between the guide pins and the end faces of the control slits 36, 37, with a further opening displacement the entraining elements 26 entrain the control plates 33, 34 and with them the front hood bar 19 and also the hood 20 fixed thereto, backwards out of the position shown in FIG. 6.

If the opened folding roof is to be closed, then the entraining elements 26 move the front hood bar 18 forwards in the relative position of the functional parts shown in FIG. 6, until the entraining elements 26 run into the curved transitions 4, 5 of the guide frame 7. With a uniform displacement velocity of the entraining elements 26 within the now curved guide channels 25, the displacement velocity of the front hood bar 18 in the direction of travel becomes increasingly less, until the displacement is completed when the entraining elements 26 enter the section of the guide channel 25 situated in the front portion 6 of the guide frame 7. During their displacement in the curved portions of the guide channel 25, the guide pins 42 of the entraining elements 26 simultaneously slide within the curved sections 39 of the control slits 36, 37, the control plates 33 and 34, now entrained further forwards, bearing with their ends against the correspondingly curved wall surfaces 35 in sliding manner. Consequently, the control plates 33, 34 are displaced transversely inwards, in a movement along the front hood bar 18 superimposed upon their forward movement.

Figure 5:
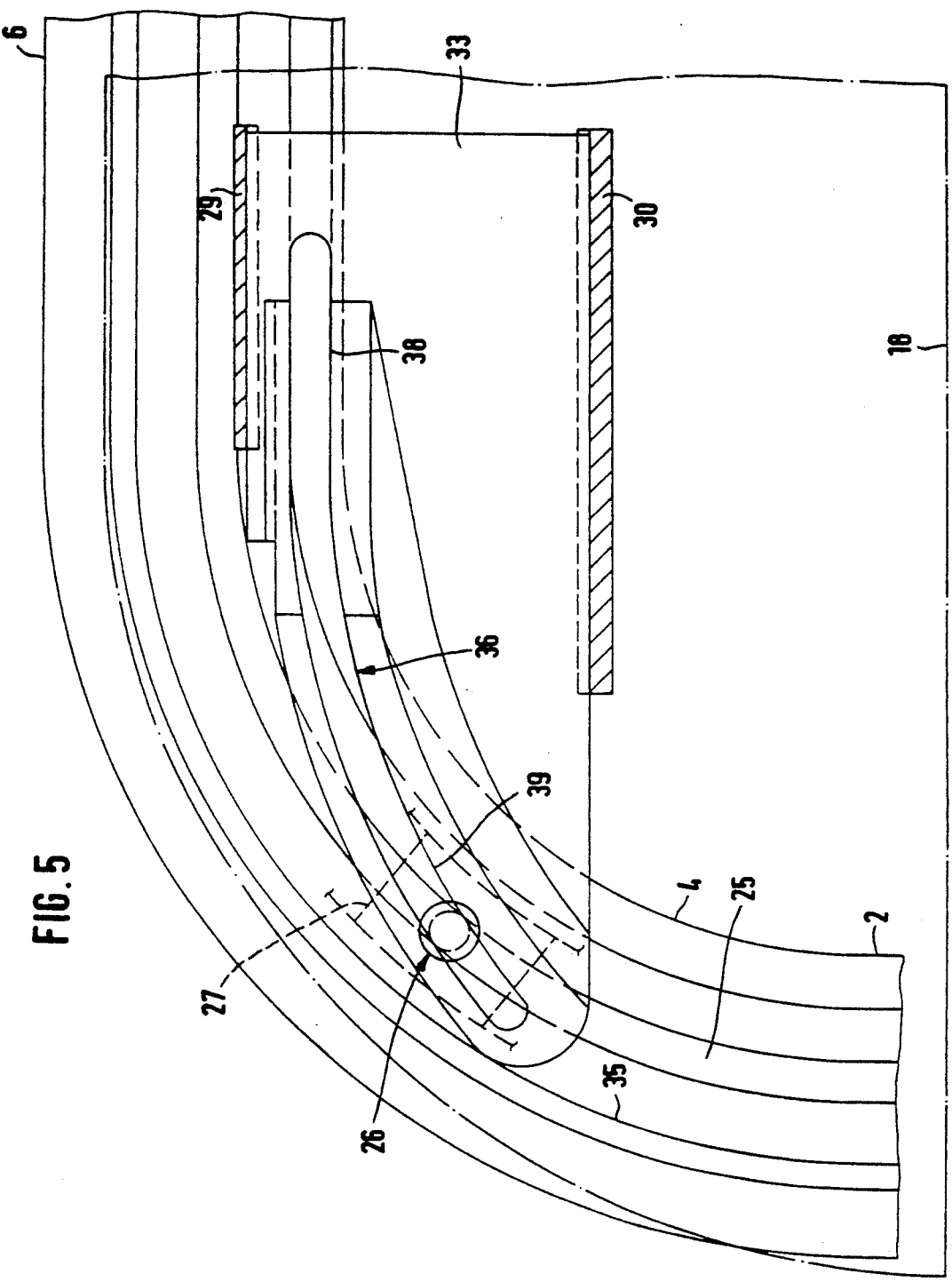
FIG. 5 is a plan view corresponding to FIG. 4, but in an intermediate position of the functional parts.

FIG. 5 shows an intermediate position of the functional parts during the closure movement of the folding roof. If the described movement sequence is continued, then the entraining elements 26, at the end of their curved travel in the curved transitions 4, 5, enter from both sides into the straight section of the guide channel 25 in the front portion 6 of the guide frame 7. Approximately simultaneously, the guide pins 42 of the entraining elements 26 leave the curved sections 39 of the control slits 36, 37 and enter the sections 38, parallel to the front member 6. At this instant, the forward displacement of the front hood bar 18 is completed. Just before entry into the sections 38, the guide pins 42 have already run into the upwardly ascending sections of the control slits 36, 37, with the result that the front hood bar 18 is increasingly displaced downwards. This means that, as the actuation of the drive in the same rotational direction is continued, the front hood bar 18 is no longer displaced forwards, but downwards, the guide pins 42 moving in the sections 38 of the control slits 36, 37 until they have reached the inner ends of the control slits, which is illustrated by the example of the left, front folding roof corner in FIG. 4. In this position, the front hood bar 18 has already been displaced fully downwards into the sealed position according to FIGS. 2 and 3. The control plates 33, 34 have now been displaced transversely into their inner limiting position.

On the basis of the construction described, the front hood bar 18, in the opening and closing displacements, with a constant rotational speed of the hand crank is displaced linearly at a constant speed in the direction of travel, so long as the entraining elements 26 are moving in the lateral guide rails 2, 3. With the entry of the entraining elements into the curved transitions 4, 5 during the closure displacement of the front hood bar 18, the velocity of displacement of the hood bar 18 in the direction of travel becomes, however, progressively smaller, until, on entry of the entraining elements 26 into the front member 6 of the guide frame 7, the value zero is reached. With continuing actuation of the hand crank at constant rotational speed in the same direction, the hood bar 18 is moved with considerable closure force downwards until it bears sealingly against the fixed automobile roof 1, without the actuation force to be applied to the hand crank being thereby notably increased. Since the entraining elements 26 or their guide pins 42 have already reached the ascending portions of the control slits 36, 37 before the forward displacement of the front hood bar 18 is completely finished, in this last phase of the closure operation a superposition of movements occurs, i.e. with a still slowly forward moving hood bar 18, this bar is simultaneously displaced downwards.

If the folding roof is now opened out of its closure position illustrated in FIGS. 1 to 4, the described movement sequence takes place in the reverse direction.

As FIGS. 1 and 2 show, the front hood bar 18 is held by the two entraining elements 26, which have moved inwards during the closure operation, in its central region and near its front edge in its pressed-on, closure position, with the result that the folding roof is securely and sealingly closed.

We claim:

1. A folding roof for an automobile for the optional closure or partial exposure of a roof opening formed in a fixed vehicle roof, comprising a front hood bar, slidably guided at both sides of the roof opening on lateral guide rails disposed in a traverse direction from one another and movable by a drive device, a fixed, rear hood bar and a foldable hood extending between the hood bars, which foldable hood is tightened by the front hood bar on closure, the front hood bar, when the roof is closed, being pressed with its front edge sealed onto the fixed automobile roof, wherein the lateral guide rails are adjoined at the front by curved transitions, which are continued parallel to the front edge of the roof opening and are provided with an upwardly open guide channel, continuous at least partly also along the lateral guide rails, in which guide channel, at each side, an upwardly projecting entraining element having a lower end which is slidably guided and synchronously movable by drive cables, the entraining elements are each force-transmittingly connected with the front hood bar by a control plate guided slidably in a transverse direction on the front hood bar, upper ends of the entraining elements each engaging longitudinally slidably but axially immovably into a control slit formed in each control plate, which slit, starting from a section, parallel to the front edge of the roof opening, continues into a rearwardly curved section, of which a radius of curvature defined by said slit is larger than a radius of curvature defined by said curved transitions of the guide channel, the control slits are arranged so as to define an upwardly ascending portion extending from said curved section to said section which extends parallel to the front edges of the roof opening, and the control plates bear slidably with their outer ends against wall surfaces of the guide rails corresponding to the curved transitions.

2. A folding roof according to claim 1, wherein the lateral guide rails, their curved transitions and a front portion connecting these together are combined to form a single-piece guide structure having a uniform cross-section throughout, which is provided throughout with guide channels for said drive cables.

3. A folding roof according to claim 1, wherein free ends of the lateral guide rails are rigidly connected together by the rear hood bar to form a structure closed on all sides, with which all components of the folding roof, including the hood, are combined to form one pre-assembled, installation unit.

4. A folding roof according to claim 1, wherein said sections of said control slits parallel to the front edge of the roof opening are in register with the continuations of the curved transition parallel to the front edge of the roof opening, situated beneath them.

* * * * *